USO10887581B2

United States Patent
Yücer et al.

(10) Patent No.: US 10,887,581 B2
(45) Date of Patent: *Jan. 5, 2021

(54) OBJECT RECONSTRUCTION FROM DENSE LIGHT FIELDS VIA DEPTH FROM GRADIENTS

(71) Applicant: Disney Enterprises, Inc., Burbank, CA (US)

(72) Inventors: Kaan Yücer, Zürich (CH); Changil Kim, Zürich (CH); Alexander Sorkine-Hornung, Zürich (CH); Olga Sorkine-Hornung, Zürich (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 108 days.

This patent is subject to a terminal disclaimer.

(21) Appl. No.: 15/799,663

(22) Filed: Oct. 31, 2017

(65) Prior Publication Data
US 2018/0139436 A1 May 17, 2018

Related U.S. Application Data

(60) Provisional application No. 62/421,178, filed on Nov. 11, 2016.

(51) Int. Cl.
*G06K 9/00* (2006.01)
*H04N 13/271* (2018.01)
(Continued)

(52) U.S. Cl.
CPC ........... *H04N 13/271* (2018.05); *G06T 7/557* (2017.01); *G06T 7/564* (2017.01); *G06T 7/593* (2017.01);
(Continued)

(58) Field of Classification Search
CPC .... H04N 13/106; H04N 13/15; H04N 13/232; H04N 13/271; G06T 7/557; G06T 7/564;
(Continued)

(56) References Cited

U.S. PATENT DOCUMENTS 9,786,062 B2 * 10/2017 Sorkine-Hornung ........................ G06T 7/593
2005/0074162 A1 * 4/2005 Tu ........................... G06T 7/593
382/154

(Continued)

OTHER PUBLICATIONS

Iizuka et al ("Efficient Depth Propagation for Constructing a Layered Depth Image from a Single Image", Computer Graphics Forum, 2014, pp. 279-289) (Year: 2015).*

(Continued)

*Primary Examiner* — Amara Abdi
(74) *Attorney, Agent, or Firm* — Kilpatrick Townsend & Stockton LLP

(57) ABSTRACT

The present disclosure relates to techniques for reconstructing an object in three dimensions that is captured in a set of two-dimensional images. The object is reconstructed in three dimensions by computing depth values for edges of the object in the set of two-dimensional images. The set of two-dimensional images may be samples of a light field surrounding the object. The depth values may be computed by exploiting local gradient information in the set of two-dimensional images. After computing the depth values for the edges, depth values between the edges may be determined by identifying types of the edges (e.g., a texture edge, a silhouette edge, or other type of edge). Then, the depth values from the set of two-dimensional images may be aggregated in a three-dimensional space using a voting scheme, allowing the reconstruction of the object in three dimensions.

16 Claims, 12 Drawing Sheets

(51) Int. Cl.

| | | |
|---|---|---|
| *H04N 13/106* | (2018.01) | |
| *H04N 13/15* | (2018.01) | |
| *G06T 17/20* | (2006.01) | |
| *H04N 13/232* | (2018.01) | |
| *G06T 7/564* | (2017.01) | |
| *G06T 7/557* | (2017.01) | |
| *G06T 7/593* | (2017.01) | |
| *G06T 15/20* | (2011.01) | |
| *G06T 15/04* | (2011.01) | |

(52) U.S. Cl.
CPC ............ *G06T 15/205* (2013.01); *G06T 17/20* (2013.01); *G06T 17/205* (2013.01); *H04N 13/106* (2018.05); *H04N 13/15* (2018.05); *H04N 13/232* (2018.05); *G06T 15/04* (2013.01); *G06T 2200/21* (2013.01); *G06T 2207/10052* (2013.01)

(58) Field of Classification Search
CPC ....... G06T 7/593; G06T 15/205; G06T 15/04; G06T 17/20; G06T 17/205; G06T 2207/10052; G06T 2200/21
See application file for complete search history.

(56) References Cited

U.S. PATENT DOCUMENTS

| | | | |
|---|---|---|---|
| 2007/0098288 A1 | 5/2007 | Raskar et al. | |
| 2009/0296984 A1* | 12/2009 | Nijim | G06T 7/55 382/103 |
| 2011/0235855 A1* | 9/2011 | Smith | G06F 3/0304 382/103 |
| 2014/0232822 A1* | 8/2014 | Venkataraman | G06K 9/66 348/43 |
| 2015/0281676 A1* | 10/2015 | Koehle | H04N 13/254 348/49 |
| 2017/0007350 A1* | 1/2017 | Popovic | A61B 34/10 |
| 2017/0046868 A1* | 2/2017 | Chernov | G06T 15/04 |

OTHER PUBLICATIONS

Wenguang et al, ("Unstructured Synthetic Aperture Photograph based Occluded Object Imaging", 2013 Seventh International Conference on Image and Graphics, pp. 34-39) (Year: 2013).*
U.S. Appl. No. 15/799,831, "Notice of Allowance", dated Sep. 5, 2018, 9 pages.
U.S. Appl. No. 15/799,831, "Non-Final Office Action", dated Feb. 8, 2018, 11 pages.
Agarwal et al., "Building Rome in a Day", Communications of the ACM, vol. 54, No. 10, 2011, pp. 105-112.
Basha et al., "Structure and Motion from Scene Registration", IEEE, Computer Vision and Pattern Recognition (CVPR), Jun. 2012, pp. 1426-1433.
Bishop et al., "Full-Resolution Depth Map Estimation from an Aliased Plenoptic Light Field", Asian Conference on Computer Vision, 2010, pp. 186-200.
Bolles , "Epipolar-Plane Image Analysis: An Approach to Determining Structure from Motion", International Journal of Computer Vision, vol. 1, No. 1, Mar. 1987, pp. 7-55.
Bradley et al., "Accurate Multi-View Reconstruction Using Robust Binocular Stereo and Surface Meshing", IEEE, Computer Vision and Pattern Recognition, Jun. 2008, 8 pages.
Buehler et al., "Unstructured Lumigraph Rendering", SIGGRAPH, Proceedings of the 28th Annual Conference on Computer Graphics and Interactive Techniques, Aug. 2001, pp. 425-432.
Chen et al., "Light Field Stereo Matching Using Bilateral Statistics of Surface Cameras", IEEE, Computer Vision and Pattern Recognition, Jun. 2014, 8 pages.
Criminisi et al., "Extracting Layers and Analysing their Specular Properties using Epipolar-Plane-Image Analysis", Computer Vision and Image Understanding, Academic Press, US, , ISSN: 1077-3142, vol. 97, No. 1, Jan. 2005, pp. 51-85.
Davis et al., "Unstructured Light Fields", Eurographics, vol. 31, No. 2, May 2012, 10 pages.
Feldmann et al., "Extension of Epipolar Image Analysis to Circular Camera Movements", IEEE, Image Processing, Sep. 2003, 4 pages.
Fuhrmann et al., "Floating Scale Surface Reconstruction", ACM Transactions on Graphics, vol. 33, Jul. 2014, 11 pages.
Fuhrmann et al., "MVE—A Multiview Reconstruction Environment", In Eurographics Workshop on Graphics and Cultural Heritage, Oct. 2014, 8 pages.
Furukawa et al., "Accurate, Dense, and Robust Multiview Stereopsis", IEEE Transactions on Pattern Analysis and Machine Intelligence, vol. 32, No. 8, Aug. 2010, pp. 1362-1376.
Furukawa et al., "Carved Visual Hulls for Image-Based Modelling", International Journal of Computer Vision, vol. 81, No. 1, Jan. 2009, pp. 53-67.
Furukawa , "Multi-View Stereo: A Tutorial", Foundations and Trends in Computer Graphics and Vision, vol. 9, No. 1-2, 2013, 164 pages.
Gastal et al., "Domain Transform for Edge-Aware Image and Video Processing", ACM Transactions on Graphics, vol. 30, No. 4, 2011, 11 pages.
Goesele et al., "Multi-view Stereo for Community Photo Collections", IEEE, International Conference on Computer Vision, Oct. 2007, 8 pages.
Goesele et al., "Multi-View Stereo Revisited", IEEE, Computer Vision and Pattern Recognition, Jun. 2006, 8 pages.
Gortler et al., "The Lumigraph", SIGGRAPH, Proceedings of the 23rd Annual Conference on Computer Graphics and Interactive Techniques, Aug. 1996, pp. 43-54.
Heber et al., "Convolutional Networks for Shape from Light Field", IEEE Conference on Computer Vision and Pattern Recognition, Jun. 2016, pp. 3746-3754.
Hornung et al., "Hierarchical Volumetric Multi-view Stereo Reconstruction of Manifold Surfaces based on Dual Graph Embedding", IEEE Computer Society Conference on Computer Vision and Pattern Recognition, Jun. 2006, 8 pages.
Hornung et al., "Robust and Efficient Photo-Consistency Estimation for Volumetric 3D Reconstruction", European Conference on Computer Vision, 2006, pp. 179-190.
Kim et al., "Scene Reconstruction from High Spatio-Angular Resolution Light Fields", ACM Transactions on Graphics, vol. 32, No. 4, Jul. 2013, 11 pages.
Seitz et al., "A Comparison and Evaluation of Multi-View Stereo Reconstruction Algorithms", IEEE Computer Society Conference on Computer Vision and Pattern Recognition, Jun. 2006, 8 pages.
Sinha et al., "Multi-view Reconstruction using Photo-consistency and Exact Silhouette Constraints: A Maximum-Flow Formulation", Tenth IEEE International Conference on Computer Vision, Oct. 2005, 8 pages.
Tao et al., "Depth from Shading, Defocus, and Correspondence Using Light-Field Angular Coherence", IEEE Conference on Computer Vision and Pattern Recognition (CVPR), Jun. 2015, 9 pages.
Venkataraman et al., "PiCam: An Ultra-Thin High Performance Monolithic Camera Array", ACM Transactions on Graphics, vol. 32, No. 6, Nov. 2013, 13 pages.
Vogiatzis et al., "Multi-View Stereo via Volumetric Graph-Cuts and Occlusion Robust Photo-Consistency", IEEE Computer Society Conference on Computer Vision and Pattern Recognition, CVPR 2005, vol. 29, No. 12, Jun. 2005, 15 pages.
Wang et al., "Occlusion-aware Depth Estimation Using Light-field Cameras", IEEE International Conference on Computer Vision, Dec. 2015, 9 pages.
Wanner et al., "Globally Consistent Depth Labeling of 4D Light Fields", IEEE Conference on Computer Vision and Pattern Recognition, Jun. 2012, 8 pages.
Yu et al., "Line Assisted Light Field Triangulation and Stereo Matching", IEEE International Conference on Computer Vision, Dec. 2013, pp. 4321-4329.
Yücer et al., "Efficient 3D Object Segmentation from Densely Sampled Light Fields with Applications to 3D Reconstruction.", ACM Transactions on Graphics, vol. 35, No. 3, Jun. 2016, 15 pages.

(56) References Cited

OTHER PUBLICATIONS

Zhang et al., "Consistent Depth Maps Recovery from a Video Sequence", IEEE Transactions on Pattern Analysis and Machine Intelligence, vol. 31, No. 6, Jun. 2009, pp. 974-988.

* cited by examiner

200
```
RECEIVE A LIGHT FIELD ASSOCIATED WITH ONE OR MORE OBJECTS
210
```
```
COMPUTE DEPTHS FOR EDGES OF THE ONE OR MORE OBJECTS
220
```
```
FOR EACH IMAGE, GENERATE A DEPTH MAP USING THE DEPTHS
230
```
```
AGGREGATE THE DEPTH MAPS IN A THREE-DIMENSIONAL SPACE
240
```
```
GENERATE A MESH FOR THE OBJECT BASED ON THE AGGREGATED DEPTH MAPS
250
```
FIG. 2

300

```
┌─────────────────────────────────────────────────────────────┐
│         IDENTIFY A FIRST POINT OF AN OBJECT IN A FIRST IMAGE │
│                              310                             │
└─────────────────────────────────────────────────────────────┘
                              ↓
┌─────────────────────────────────────────────────────────────┐
│      IDENTIFY AN EPIPOLAR LINE FOR THE FIRST POINT IN A SECOND IMAGE │
│                              320                             │
└─────────────────────────────────────────────────────────────┘
                              ↓
┌─────────────────────────────────────────────────────────────┐
│        IDENTIFY ONE OR MORE SECOND POINTS ALONG THE EPIPOLAR LINE │
│                              330                             │
└─────────────────────────────────────────────────────────────┘
                              ↓
┌─────────────────────────────────────────────────────────────┐
│   IDENTIFY ONE OR MORE ADDITIONAL POINTS IN THE FIRST IMAGE BASED ON THE ONE │
│                    OR MORE SECOND POINTS                     │
│                              340                             │
└─────────────────────────────────────────────────────────────┘
                              ↓
┌─────────────────────────────────────────────────────────────┐
│   DETERMINE THAT A SECOND POINT OF THE ONE OR MORE SECOND POINTS │
│  CORRESPONDS TO THE FIRST POINT BASED ON A COLOR OF EACH OF THE ONE OR │
│  MORE FIRST POINTS AND A COLOR OF EACH OF THE ONE OR MORE SECOND POINTS │
│                              350                             │
└─────────────────────────────────────────────────────────────┘
                              ↓
┌─────────────────────────────────────────────────────────────┐
│   COMPUTE A DEPTH FOR THE FIRST POINT BASED ON THE FIRST POINT AND THE │
│                         SECOND POINT                         │
│                              360                             │
└─────────────────────────────────────────────────────────────┘
```

FIG. 3

OBJECT RECONSTRUCTION FROM DENSE LIGHT FIELDS VIA DEPTH FROM GRADIENTS

CROSS-REFERENCES TO RELATED APPLICATIONS

This application claims the benefit of U.S. Provisional Application No. 62/421,178, filed Nov. 11, 2016, the entire disclosure of which is hereby incorporated by reference.

BACKGROUND

Reconstructing objects in three dimensions from a set of two-dimensional images is a long standing problem in computer vision. And despite significant research efforts, objects with thin features still pose problems for many reasons. First, the thin features occupy only a small number of pixels in the views that they are visible in, making locating them difficult. Moreover, many object reconstruction techniques miss the thin features because the techniques require patches on the objects to be several pixels wide, which is not always the case with thin features. The thin features are also usually only visible in a small number of views, making matching the thin features between different views difficult. Other reconstruction techniques face difficulties with texture-less thin features because it is hard for such techniques to localize the features using photoconsistency values inside a volumetric discretization, often resulting in elimination of these features in the reconstruction. Therefore, there is a need in the art to improve techniques for reconstructing objects in three dimensions from a set of two-dimensional images.

SUMMARY

The present disclosure relates generally to object reconstruction. More particularly, techniques are described for reconstructing an object in three dimensions that is captured in a set of two-dimensional images.

In some embodiments, the object is reconstructed in three dimensions by computing depth values for edges of the object in the set of two-dimensional images. In such embodiments, the set of two-dimensional images may be samples of a light field surrounding the object. The depth values may be computed by exploiting local gradient information in the set of two-dimensional images, allowing the depth values for different edges to be computed in parallel. After computing the depth values for the edges, depth values between the edges may be determined by identifying types of the edges (e.g., a texture edge, a silhouette edge, or other type of edge). Then, the depth values from the set of two-dimensional images may be aggregated in a three-dimensional space using a voting scheme, allowing the reconstruction of the object in three dimensions.

Various embodiments are described herein, including methods, systems, non-transitory computer-readable storage media storing programs, code, or instructions executable by one or more processors, and the like. For example, a method may include receiving a light field represented by multiple images, including at least a first image and a second image. The multiple images may capture an object at different viewpoints. For example, the first image may be at a different viewpoint than the second image. In some embodiments, the light field may be unstructured.

The method may further perform the following steps for each point of the object located on an edge of the object in the first image, the steps including identifying a first point of the object in the first image. The first point may be an edge of the object from the viewpoint of the first image. Based on the first point, a second line may be identified in the second image, the second line having a direction of an epipolar line for the first point of the object in the first image.

The steps may further include identifying one or more second points along the second line. Based on projecting the one or more second points, one or more additional first points may be identified along a first line, the first line intersecting the first point.

A second point of the one or more second points may be determined to correspond to a first point of the one or more first points based on a color of each of the one or more first points and a color of each of the one or more second points. The correspondence between the second point and the first point indicates that the second point is an estimate of where the first point is in the second image. In response to determining that the second point corresponds to the first point, a depth may be computed for the first point based on the first point and the second point. In some embodiments, the depth may be computed using a color gradient for the first image, the color gradient based on colors of the one or more first points and the one or more second points. For example, a direction of the color gradient may be used to estimate the depth.

In some embodiments, the depth for an edge may be propagated to one or more points around the edge based on a type of the edge. For example, when the edge is determined to be a texture, the depth for the edge is propagated on both sides of the edge (i.e., in two dimensions). When the edge is determined to be a silhouette, the depth for the edge is propagated on one side of the edge (i.e., in one dimension).

One method for determining the type of the edge is to identify multiple points along a first line perpendicular to the edge in a first image, identify the edge in a second image, identify multiple points along a second line perpendicular to the edge in the second image, and determine the type of the edge based on a color of each of the one or more points along the first line and each of the one or more points along the second line. In the method for determining the type of the edge described above, the multiple points along the first line may be a first image gradient, and the multiple points along the second line may be a second image gradient. In addition, a first point of the multiple points along the first line may be on a particular side of the edge in the first image and a second point of the multiple points along the second line may be on the particular side of the color edge in the second image. In such examples, the edge is a first type when the first point and the third point are different colors and the edge is a second type when the first point and third point are the same color.

After the above steps are performed for each point of the object located on an edge in the first image, a depth map may be generated for the first image using the computed depths. Additionally, similar steps may be performed for each image of the multiple images such that multiple depth maps are generated. Using the multiple depth maps, a mesh for the object may be generated, where each point of the object is determined by comparing depths of the point across the multiple depth maps. The mesh be a three-dimensional representation of the one or more objects. In some embodiments, the mesh may be rendered such that a user may view the mesh.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF THE DRAWINGS

Illustrative embodiments are described in detail below with reference to the following figures:

FIG. 2 is a simplified flowchart depicting processing performed for generating a mesh for an object according to certain embodiments;

FIG. 3 is a simplified flowchart depicting processing performed for determining a depth of a point on an object according to certain embodiments;

DETAILED DESCRIPTION

In the following description, for the purposes of explanation, specific details are set forth in order to provide a thorough understanding of embodiments of the present disclosure. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the present disclosure as set forth in the appended claims.

Reconstructing objects in three dimensions from a set of two-dimensional images is a longstanding problem in computer vision. And despite significant research efforts, objects with thin features still pose problems for many reasons. For example, the thin features occupy only a small number of pixels in the views that they are visible in, making locating them difficult. The thin features are also usually only visible in a small number of views, making matching the thin features between different views difficult.

In some embodiments, an object is reconstructed in three dimensions by computing depth values for edges of the object in the set of two-dimensional images. In such embodiments, the set of two-dimensional images may be samples of a light field surrounding the object. The depth values may be computed by exploiting local gradient information in the set of two-dimensional images, allowing the depth values for different edges to be computed in parallel. After computing the depth values for the edges, depth values between the edges may be determined by identifying types of the edges (e.g., a texture edge, a silhouette edge, or other type of edge). Then, the depth values from the two-dimensional images may be aggregated in a three-dimensional space using a voting scheme, allowing the reconstruction of the object in three dimensions.

Figure 1:
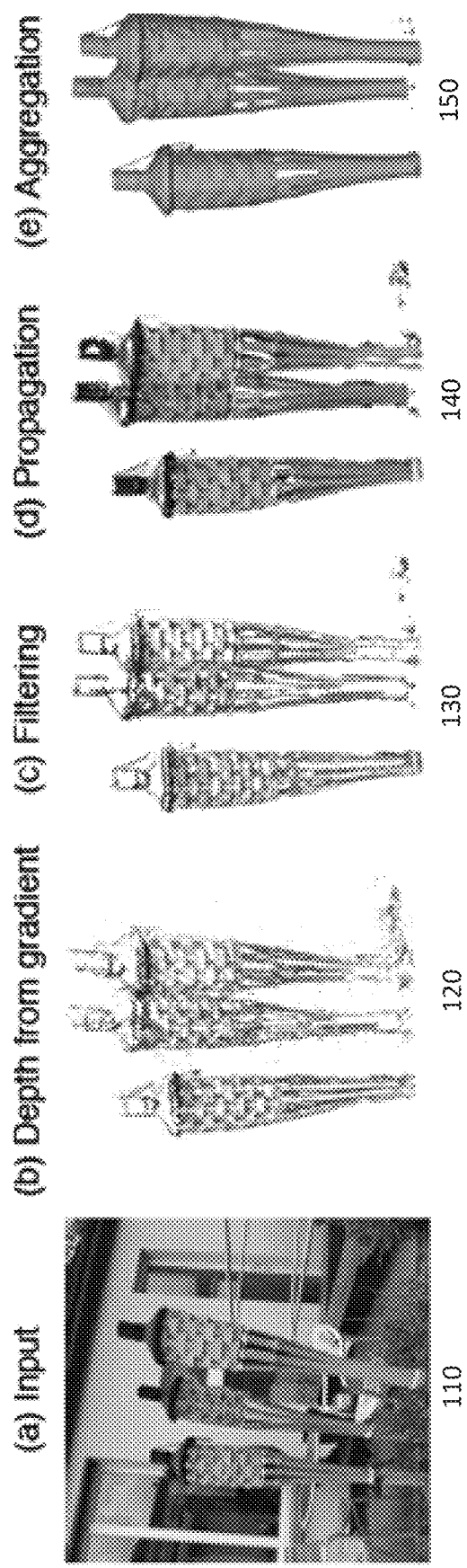
FIG. 1 is a diagram depicting stages for generating a mesh for an object according to certain embodiments.

FIG. 1 is a diagram depicting stages for generating a mesh for an object according to certain embodiments. The stages may begin at an input stage 110 when multiple images are received. The multiple images may capture a light field surrounding one or more objects, each image from a different viewpoint. For example, the input stage 110 in FIG. 1 depicts an image with three Tiki torches.

After the input stage 110, a depth from gradient stage 120 may begin. The depth from gradient stage 120 may include identifying depths for each point that is an edge of the one or more objects in each image of the multiple images. The depths may be generated by locating edges of the one or more objects between images, as further described below with reference to FIGS. 2, 4, and 5A-5D.

A filtering stage 130 may be next. In the filtering stage 130, one or more depths identified in the depth from gradient stage 120 may be removed. The depths that are removed may be those that are identified as being inaccurate based on depths determined in other images. In some embodiments, depths may be removed when they are inconsistent between different images. For example, a first image may indicate that a first point is a first depth. A second image and a third image may indicate that a point corresponding to the first point is a second depth, the second depth notably different than the first depth. Accordingly, the first point may be set as a second depth.

A propagation stage 140 may expand identified depths to areas between edges. For example, an edge may be determined to be a silhouette edge or a texture edge. A silhouette edge may be a boundary of an object where points on each side of the texture have different depths, one side having approximately the same depth as the silhouette edge and the other side having a different depth. For a texture edge, points on both sides of the edge may have similar trajectories (e.g., depths), whereas for silhouette edges, one side of the edge may follow the same trajectory. Accordingly, depths may be expanded according to characteristics of types of edges.

The stages in FIG. 1 may end with an aggregation stage 150. The aggregation stage 150 may combine each of the depth maps that were generated to create a three-dimensional mesh for the one or more objects captures in the multiple images that were received in the input stage 110.

FIG. 2 is a simplified flowchart 200 depicting processing performed for generating a mesh for an object according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG.

2 depicts the various processing steps occurring in a particular sequence or order, this is not intended to be limiting. In certain embodiments, the steps may be performed in some different order or some steps may also be performed in parallel.

In the embodiment depicted in FIG. 2, the processing may begin at block 210, when a light field associated with one or more objects is received (sometimes referred to as the input stage, as illustrated at 110 in FIG. 1). The light field may be represented by multiple images, each image capturing the one or more objects from a different viewpoint. Each image may also include an associated camera pose (e.g., an orientation of a camera when capturing the image and/or a location relative to other images in the light field).

In some embodiments, the light field may be unstructured, meaning that the images representing the light field were captured in an unstructured manner. For one illustrative example, the unstructured light field may be captured by a video camera moving around an object (e.g., an HD video containing thousands of frames to sample the light field surrounding one or more objects). In some embodiments, the light field may be generated using high spatio-angular sampling such that fine features of objects become more prominent due to increased coherency and redundancy in data.

At block 220, depths may be computed for edges of the one or more objects. In some embodiments, depths for all of the edges of the one or more objects may be computed for each of the multiple images. A depth for an edge may be computed using gradients of pixels around the edge from images with different viewpoints. For example, a gradient direction over multiple images may give a local, linear approximation of the trajectory of the edge at a viewpoint, from which a depth of the edge may be computed, as described below with reference to FIGS. 3-5.

Figure 4:
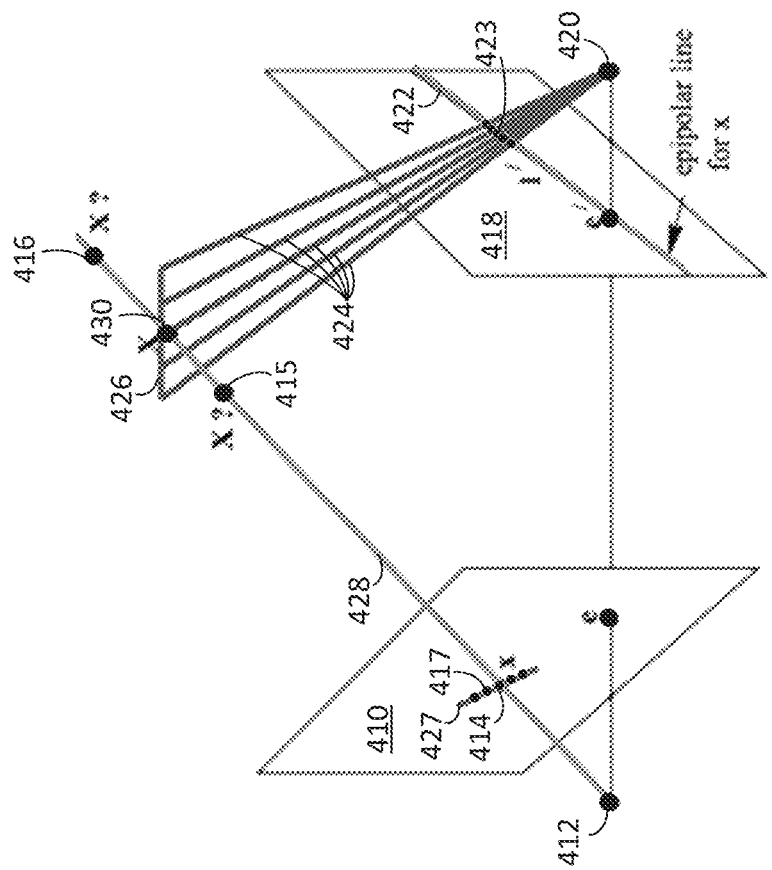
FIG. 4 is a diagram depicting a depth of a point on an object being determined.

FIG. 3 is a simplified flowchart 300 depicting processing performed for determining a depth of a point on an object according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain embodiments, the steps may be performed in a different order or some steps may also be performed in parallel. FIG. 4 will be used throughout the description of FIG. 3 to further illustrate determining the depth of the point. FIG. 4 visually depicts determining a depth of first point 414 on an object. FIG. 4 includes first image 410 with first optical center 412 and second image 418 with second optical center 420. As can be seen in FIG. 4, the viewpoint of first image 410 is different than the viewpoint of second image 418.

In the example depicted in FIG. 3, the processing may begin at 310 when a first point (which corresponds to first point 414 depicted in FIG. 4) of an object is identified in a first image (which corresponds to first image 410 depicted in FIG. 4). While not necessary, the first point may be an edge of the object. To identify an edge of the object, a high-gradient region (e.g., large change in color across multiple pixels) of an image may be identified. However, it should be recognized that the edge of the object may be identified using other methods. It should be recognized that each point (or each edge of the object) in the first image may be performed using similar processing described in FIG. 3. Referring to FIG. 4, a line 428 from the first optical center 412 through the first point 414 may be identified. The line 428 may be used to estimate a depth of the first point 414. For example, point 415 and point 416 illustrate two possible depths that may correspond to the first point 414.

At 320, after identifying the first point, an epipolar line (which corresponds to epipolar line 422 depicted in FIG. 4) may be identified in a second image (which corresponds to second image 418 depicted in FIG. 4). The epipolar line may be for the first point. A person of ordinary skill in the art will recognize that any other suitable techniques can be used to determine the epipolar line based on the first point. For example, given a calibrations of two cameras, an epipolar line may be computed from a camera matrices. In such an example, a point in a first image may corresponds to a line in a second image. The computation may use the fundamental matrix between two cameras.

At 330, one or more second points (which include to a second point 423, as depicted in FIG. 4) may be identified along the epipolar line. The one or more second points may be estimates for a point in the second image that corresponds to the first point 414. For example, the epipolar line may be sampled equidistantly to select the one or more second points. The one or more second points may range from a minimum distance to a camera center to a maximum distance to the camera center. In some examples, the one or more second points may be used as intersection points for rays (which correspond to rays 424 depicted in FIG. 4) from an optical center of the second image (which corresponds to second optical center 420).

At 340, one or more additional points from the first image (which include an additional point 417 depicted in FIG. 4) may be identified. The one or more additional points may be along a line (which correspond to a line 427 depicted in FIG. 4) that intersects the first point (e.g., the first point 414). In some embodiments, the line that intersects the first point may be determined based on the one or more second points. For example, the one or more second points may be projected (sometimes referred to as back-projected) to the first image using a fronto-parallel plane (which corresponds to a fronto-parallel plane 426) placed at a particular depth 430 from the optical center of the first image. In such an example, the one or more additional points may include the first point. In some examples, a point (p2) may be selected on a second line in a second image corresponding to a depth value (d). A plane may be placed at depth d, which may be parallel to a camera plane of the first image. Points may then be projected along the epipolar line around p2 to the first image using the plane at depth d. The front parallel plane may be parallel to a plane of the first image at depth d, where the depth is computed using a point on the epipolar line in the second image.

At 350, a second point (which corresponds to the second point 423 depicted in FIG. 4) of the one or more second points (from the second image) is determined to correspond to the first point (which corresponds to the first point 414 depicted in FIG. 4) (from the first image) based on a color of each of the one or more first points (which correspond to the points identified on the line 427 depicted in FIG. 4) and a color of each of the one or more second points (which correspond to the points identified on the epipolar line 422). The second point may correspond to the first point when the first point and the one or more additional points have the same or similar color as the one or more second points. For example, the second point may have the same or similar color as the first point, and one or more second points around the second point may have the same or similar color as one or more first points around the first point. A similar color of a first color may refer to a color that is a different shade but is within a reasonable number of shades of the first color.

At 360, a depth for the first point may be computed based on the first point and the second point. For example, the particular depth of the fronto-parallel plane (which may be determined based on the first point and the second point) used to identify the one or more additional points may be determined to be the depth. The depth of the fronto-parallel plane may or may not be the depth. If both line segments in both images are exactly the same, then this depth is the depth. If the line is shifted to one direction, a depth may be computed using the gradient between the two line segments, as described below in the next paragraph.

A mathematical description of FIG. 3 will now be described. Given a three-dimensional light field L represented by a set of images ($I_1 \ldots, I_n$) (e.g., the first image and the second image), where L(x, y, i) refers to a pixel p=(x, y) (i.e., the first point) in image $I_i$ (i.e., the first image), and their camera projection matrices $P_i$, the light field gradient $\nabla L_{i,j}$ around pixel p (in image $I_i$) and pixel q (in image $I_j$ (i.e., the second image)) may be defined as:

$$\nabla L_{i,j}(p,q) = \nabla s_{i,j}(p,q),$$

where $s_{i,j}(p, q)$ is a 2×5 image patch constructed by stacking a 5-pixel-long light field segment centered at pixel p in image $I_i$ and a 5-pixel-long light field segment centered at point q in image $I_j$ together. However, it should be recognized that the image patch may be a different size. The term $s_{i,j}(p, q)$ may be constructed by using the epipolar geometry between the views image $I_i$ and image $I_j$. In some examples, the actual scene point at point p may appear on its epipolar line l in image $I_j$.

Given a reference pixel q in image $I_j$ along the epipolar line l, a multiple pixel-long segment (e.g., 5-pixel long segment) may be sampled in image $I_j$ along the epipolar line l centered at reference pixel q to generate $s_j(p, q)$ (i.e., the one or more second points). The reference pixel q also may correspond to a depth value $d_q$ for the pixel p as a result of epipolar geometry. The sampled points may be projected in image $I_j$ back to image $I_i$ using a fronto-parallel plane placed at depth $d_q$, and sample image $I_i$ at these locations to generate $s_i(p, q)$ (i.e., the first point and the one or more additional points). In some examples, image $I_i$ and image $I_j$ may face similar directions. If the depth value $d_q$ is the actual depth value for pixel p, $s_i(p, q)$ and $s_j(p, q)$ may be identical. If the actual depth deviates from depth $d_q$, the colors in $s_j(p, q)$ may be a shifted version of the colors in $s_i(p, q)$. In both cases, $\nabla s_{i,j}(p, q)$ may be used to compute the trajectory of the points between the two segments using the direction perpendicular to the gradient direction:

$$\gamma_{i,j}(p,q) = \tan^{-1}(-\Lambda_x s_{i,j}(p,q)/\nabla_y s_{i,j}(p,q)).$$

Using $\gamma_{i,j}(p, q)$, we may find the mapping $p_j^s$ of pixel p in $s_j(p, q)$:

$$p_j^s = 1/\tan(\gamma_{i,j}(p,q)),$$

In some examples, $p_j^s$ may be mapped back to epipolar line l to compute the mapping pj, from which the actual depth $d_p$ may be computed via triangulation, as visually illustrated in FIG. 4.

The next step may be associated with determining how to sample pixel q in image $I_j$. If depth $d_q$ is close to the actual depth of the scene point at pixel p, a reliable depth computation may be expected. However, if the difference between pixel q and $p_j$ is larger than a pixel, the gradient computation may become unstable, leading to erroneous results. To that end, epipolar line l may be sampled multiple times between $q_{min}$ and $q_{max}$, which correspond to reference points for the minimum and maximum depths of the scene, and get a set of reference points $q^k$, k∈1, ..., K, where K is the number of samples. In some examples, $q^k$ may be sampled one pixel apart from each other, compute a mapping $p_j^k$ for each reference point $q^k$, and choose the depth $d_p^k$ that maximizes two confidence measures. The colors of pixel p and $p_j^k$ may be expected to be similar due to color constancy:

$$C_i^c(p, p_j^k) = \exp\left(-\frac{1}{2\sigma_c^2}\|I_i(p) - I_j(p_j^k)\|_2^2\right).$$

In some examples, $\sigma_c$ may equal 0.025. The gradient computation may result in more robust depth estimates, if $q^k$ and $p_j^k$ are close, e.g., the depth $d_p^k$ of pixel p is close to the depth of the plane $d_p^k$ used for gradient computation:

$$C_i^d(p,p_j^k) = \exp(-|d_q^k - d_p^k|^2)$$

The final confidence measure may be computed by multiplying the individual components in $$C_i(p,p_j^k) = C_i^c(p,p_j^k) \cdot C_i^d(p,p_j^k).$$

For each pixel p, $p_j^k$ may be chosen which maximizes this confidence measure as the mapping $p_j$, and the depth value $d_p$ and the confidence value $C_p$ may be stored.

In some examples, the depth maps may be computed for image $I_i$ using the nearest neighbors $I_{i-1}$ and $I_{i+1}$, and hierarchically move to next images in light map L to adjust the depth estimates further. After the initial step, the depth estimate $d_p$ for pixel p may be used as the initial guess, and K reference points $q^k$ around the new pixel q in $I_{i+2}$ corresponding to depth $d_p$ may be sampled. The reference points may again be sampled one pixel apart from each other. In some examples, as distance increases away from image $I_i$ in light map L, the relative motion of a point along the epipolar line with respect to the change in depth may get faster. However, since we again sample K reference points, the depth range may be implicitly made smaller at each step, leading to more precise depth estimates. Depths may be computed over the views whose viewing directions are no more different from that of image $I_i$ than 5° for each viewpoint, and the final depth maps $D_i$ may be stored with their confidence maps $C_i$. Because the scene points' trajectories are only visible around high gradient regions, the depths may be computed only around regions with enough gradient response, i.e., $\forall p, \|\nabla I_i(p)\| > g$, where g=0.05.

Figure 5B:
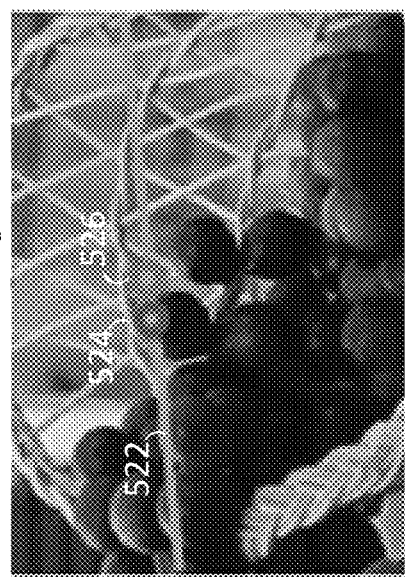
FIGS. 5A-5D illustrate an example for determining corresponding points of an object between images.
Figure 5D:
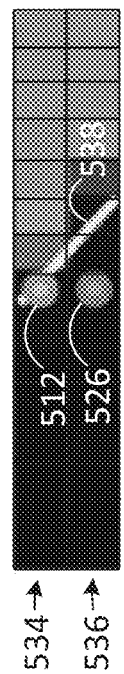
Figure 5A:

FIGS. 5A-5D illustrate an example for determining corresponding points of an object (e.g., a basket full of grapes) between images. For example, pixels that are determined to be an edge pixel may be selected for processing. In some cases, a pixel can be determined to be an edge pixel by calculating a gradient for the pixel. A pixel having a high gradient value can be determined to be an edge pixel. For example, a pixel that is adjacent to pixels of a first color in one direction and pixels of a second color in the opposite direction can have a high gradient. A first point 512 (which may correspond to first point 414 in FIG. 4) (sometimes referred to as a pixel) may be selected on an edge of the object in a first image 510, as illustrated in FIG. 5A. The first point 512 may be selected because it is on a color edge of the object in the first image 510.

An epipolar line 522 may be identified in a second image 520, as illustrated in FIG. 5B. The second image 520 may be a different viewpoint of the object than presented in the first image 510. The epipolar line 522 may be a function of the position of the first point 512 in a three-dimensional space. For example, the epipolar line 522 may indicate a location of a point in the second image 520 that corresponds to the first point 512.

A second point 524 (sometimes referred to as a pixel) along the epipolar line 522 may be selected from the second image 520, as illustrated in FIG. 5B. The second point 524 may be a first estimate of which point in the second image 520 corresponds to the first point 512. In some cases, the second point 524 may a point on the epipolar line 522 that is a color edge, as described above.

After identifying the second point 524, one or more points (sometimes referred to as one or more second points) may be identified around the second point 524. For example, one or more points along the epipolar line 522 on each side of the second point 524 may be identified. Color values (e.g., red, green, and/or blue color components, luma and/or chroma color components, and/or color values of other suitable color components of the points) of the one or more points may then be extracted, as illustrated in a second row 530 of the grid shown in the image of FIG. 5C. While FIG. 5C illustrates a particular number of points around the second point 524 used, it should be recognized that any number of points in each direction may be used, including a different number of points in one direction than another direction.

A second line 514 may be identified in the first image 510, as illustrated in FIG. 5A. The second line 514 may correspond to the epipolar line 522. For example, the one or more second points from the second image 520 may be projected onto the first image using a fronto-parallel plane. Depending on the depth of the fronto-parallel plane, different second lines may be determined. A depth of a plane may be computed from a "central" point in the epipolar line 522, and the depth may be used for projection. This may occur multiple times to obtain a best estimate.

After identifying the second line 514, one or more points along the second line 514 to each side of the first point 512 may be identified. Color values (e.g., red, green, and/or blue color components, luma and/or chroma color components, and/or color values of other suitable color components of the points) of the one or more points may then be extracted, as illustrated in a first row 528 of the grid shown in the image of FIG. 5C and as further illustrated in a first row 534 of the grid shown in the image of FIG. 5D. While FIGS. 5C and 5D illustrate using a particular number of points around the first point 512, it should be recognized that any number of points in each direction may be used, including a different number of points in one direction than another direction.

Figure 5C:

Colors of points around the first point 512 (e.g., a row of 15 pixels) may also be extracted, as illustrated in a first row 528 in FIG. 5C. The points around the first point 512 may be along the second line 514, which corresponds to the epipolar line 522.

After the first row 528 and the second row 530 of the grid shown in FIG. 5C are determined, the rows 528 and 530 may be compared to each other to determine whether the first point 512 corresponds to the second point 524. As illustrated in FIG. 5C by a third line 532, the points in the first row 528 and the second row 530 do not line up. Instead, the third line 532 illustrates that a point that is two grid boxes to the left from the second point 524 corresponds to the first point 512. In some examples, the process described above may repeat with the point that is two points over from the second point 524. By repeating the process, it may be confirmed that the point that is two points over from the second points 524 corresponds to the first point 512.

While FIG. 5C illustrates the capability to determine which point in the second row 530 corresponds to the first point 512, it should be recognized that the determination may just be that the two rows do not match, and in such cases a new point must be selected from the epipolar line 522. For example, based on determining that the rows do not match, another point may be newly selected from the second image 520, and the process described above may be repeated for the newly selected point. In one illustrative example depicted in FIG. 5B, a third point 526 along the epipolar line 522 may be selected from the second image 520.

After the third point 526 is identified, one or more points (sometimes referred to as pixels) may be identified around the third point 526. For example, one or more points along the epipolar line 522 to each side of the third point 526 may be identified. Color values (e.g., red, green, and/or blue color components, luma and/or chroma color components, and/or color values of other suitable color components of the points) of the one or more points may then be extracted, as illustrated in a fourth row 536 of the grid shown in FIG. 5D. While FIG. 5D illustrates using a particular number of points around the third point 526, it should be recognized that any number of points in each direction may be used, including a different number of points in one direction than another direction.

Similar to as described above, a third row 534 (corresponding to the first row 528 in FIG. 5C) and the fourth row 536 may be compared to each other to determine whether the first point 512 corresponds to the third point 526. As illustrated in FIG. 5D by a fourth line 538, the points in the third row 534 and the fourth row 536 do not line up. Instead, the fourth line 538 illustrates that a point that is two points over from the third point 526 corresponds to the first point 512. Based on determining which points correspond to each other, another point may be selected from the second image 520 to repeat the process described above. For example, a fourth point along the epipolar line 522 may be selected from the second image 520, with the fourth point being between the second point 524 and the third point 526. Such an iterative process can be performed until points are determined to align in rows 528 and 530 (or rows 534 and 536), indicating that a matching point has been determined. Once a matching point has been determined, a depth for the first point 512 may be determined based on the fronto-parallel plane used to determine the points around the first point 512. For example, the front-parallel plane may correspond to a depth, which may be used as the depth for the first point 512.

Referring back to FIG. 2, at 230, after depths are generated for edges of the one or more objects for an image, a depth map may be generated for the image. The depth map may indicate a depth (e.g., a distance from an optical point) for one or more points in the image. Depth maps may be generated for each image where depths have been determined.

In some embodiments, a depth map may be compared with other depth maps to confirm accuracy of the depth map. When a point is identified to be inaccurate (i.e., depths for the points between images do not match), the point may be removed from the depth map based on its inconsistency with the estimates from other depth maps for other views with similar viewing directions (sometimes referred to as a filtering stage, as illustrated at 130 in FIG. 1).

In some embodiments, the three-dimensional space may be discretized where the foreground object resides using a fine, regular voxel grid (referred to as V). In some examples, the image regions that project inside this grid may be denoted as foreground pixels, and the rest as background pixels.

In order to filter a depth map $D_i$ of image $I_i$, the depth values and the confidences of other views (whose viewing directions are similar to that of image $I_i$) may be back-projected to the voxel grid. In some embodiments, a viewpoint of image $I_i$ may be similar to another viewpoint of another image when the viewpoint of the other image is no larger than 15° from the viewpoint of image $I_i$. For each $v \in V$, the contributions of all back-projected 3D fore-ground points x may be summed using a voting scheme defined as follows:

$$H(v) = \sum_x c_x \cdot \exp\left(-\frac{1}{2\sigma_c^2}\|v-x\|_2^2\right),$$

where $c_x$ is the confidence value associated to x.

The depth $D_i(p)$ of each foreground pixel p may be reassigned to the depth value of the most voted voxel along the viewing ray from the camera center through pixel p. Because the shape of the foreground object may be important, the foreground points may be filtered, while background depths may be kept as they are.

To generate a more complete three-dimensional object reconstruction, depth information may be propagated towards low-gradient regions (e.g., regions that have not been identified as an edge) (sometimes referred to as a propagation stage, as illustrated at 240 in FIG. 2). Propagation may be based on whether a high-gradient region (or an edge) corresponds to a texture boundary or an object boundary.

By looking at points around an edge, texture and silhouette edges may be differentiated (sometimes referred to as bidirectional photoconsistency). A texture edge is a boundary of a pattern where points on both sides of the texture edge have approximately the same depth. A silhouette edge is a boundary of an object where points on each side of the texture have different depths, one side having approximately the same depth as the silhouette edge and the other side having a different depth. For a texture edge, points on both sides of the edge may have similar trajectories (e.g., depths), whereas for silhouette edges, one side of the edge may follow the same trajectory.

Figure 6:
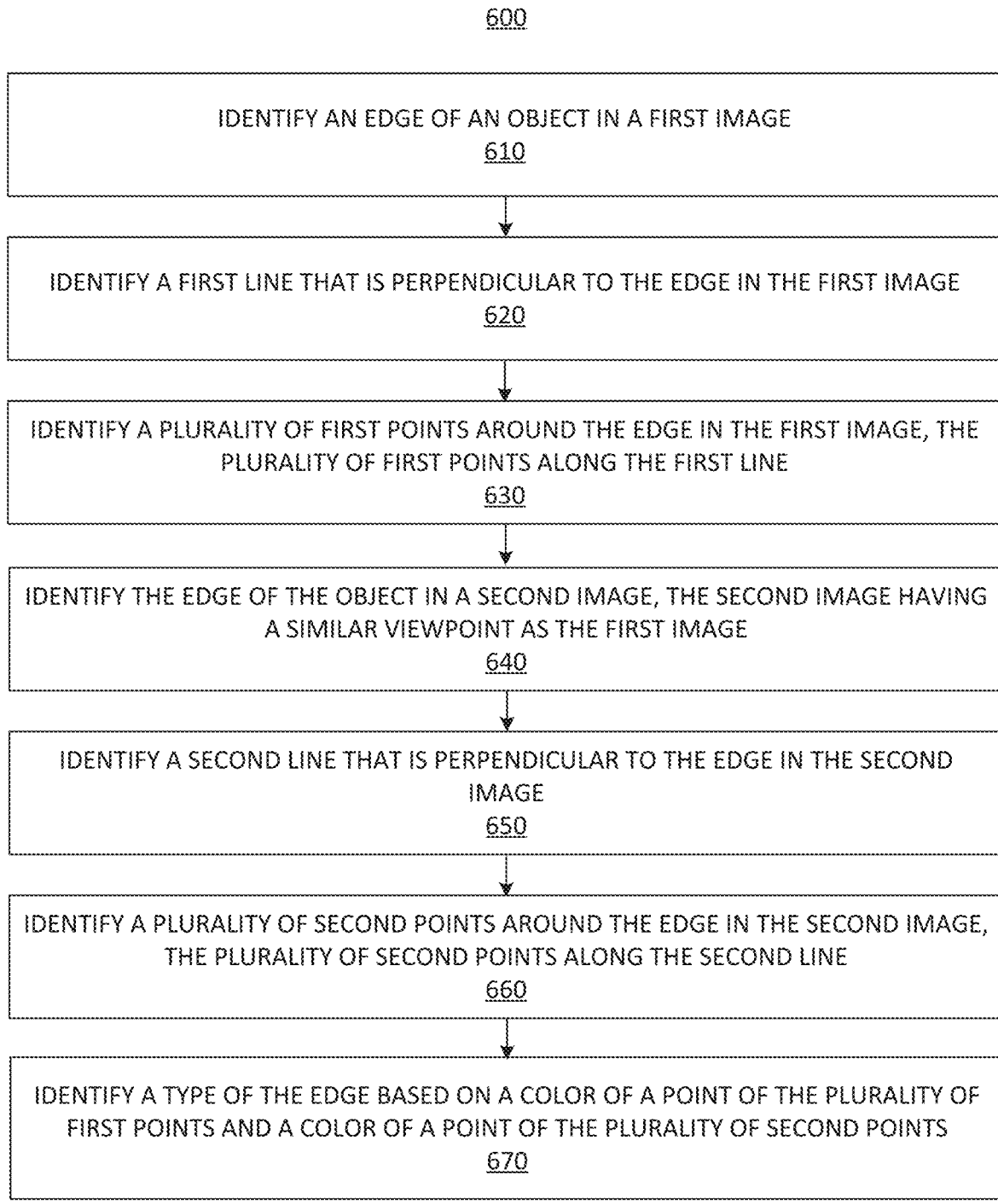
FIG. 6 is a simplified flowchart depicting processing performed for identifying a type of an edge of an object.

FIG. 6 illustrates a process 600 for identifying a type of an edge of an object. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain embodiments, the steps may be performed in some different order or some steps may also be performed in parallel.

In the embodiment depicted in FIG. 6, the processing may begin at 610 when an edge of an object is identified in a first image. While only one edge is referred to here, it should be recognized that this process may be repeated for each edge of the object.

At 620, a first line in the first image may be identified. The first line may be perpendicular to the edge in the first image. For example, if the edge is going from top to bottom of the first image, the first line may be going from left to right of the first image. At 630, a plurality of points around the edge in the first image may be identified. The plurality of points may be along the first line. For example, one or more points on a first side of the edge in the first image may be identified and one or more points on a second side of the edge in the first image may also be identified.

At 640, the edge of the object in a second image may be identified. The second image may be from a similar viewpoint as the first image. In certain embodiments, two images are from a similar viewpoint when a viewpoint of the first image is less than 15 degrees different from a viewpoint of the second image. The edge may be identified by embodiments described above.

At 650, a second line in the second image may be identified. The second line may be perpendicular to the edge in the second image, similar to as described above. At 660, a plurality of second points around the edge in the second image may be identified. The plurality of second points may be along the second line. For example, one or more points on a first side of the edge in the second image may be identified and one or more points on a second side of the edge in the second image may also be identified.

At 670, a type of the edge may be identified based on a color of each of one or more points of the plurality of first points and a color of each of one or more points of the plurality of second points. The type of the edge may be identified as either a silhouette edge or a texture edge. A silhouette edge may be an edge that includes pixels associated with an object on both sides of the edge. A texture edge may be an edge that includes pixels associated with an object only on one side of the edge.

Figure 7:
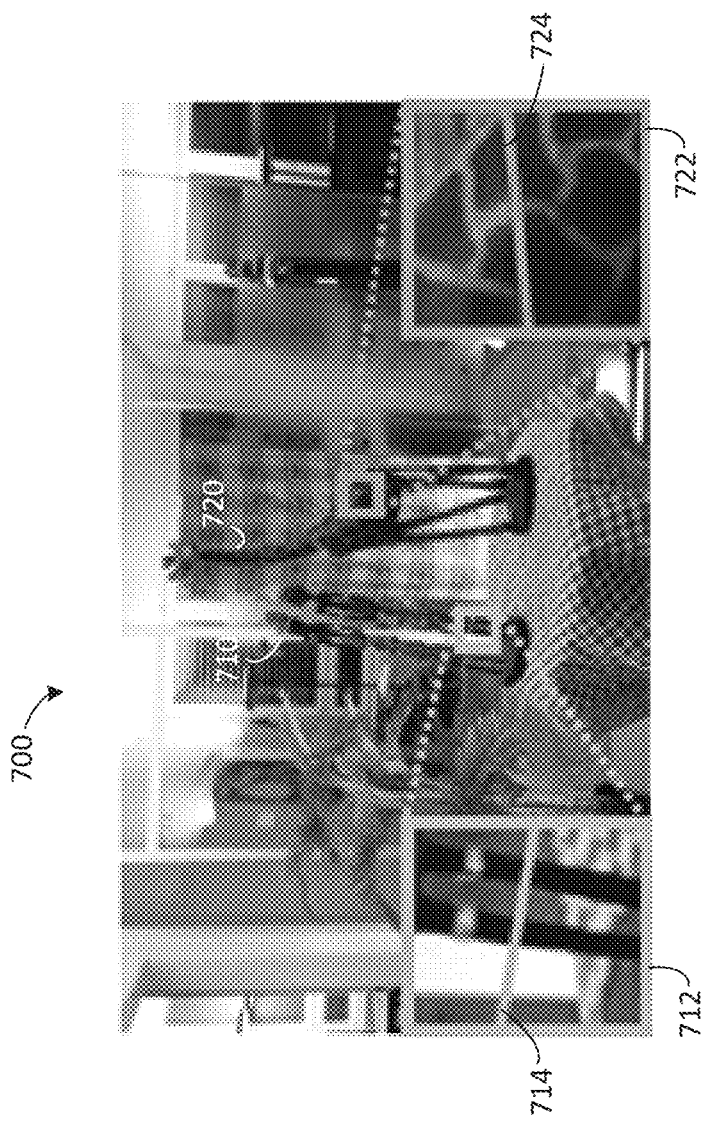
FIG. 7 is an image where edges may be identified.

FIG. 7 illustrates an example of an image 700 where edges may be identified. In the image 700, there are two objects: a first object 710 and a second object 720. As can be seen from the image 700, it may be difficult to determine which edges are parts of an object and which edges indicate a transition from an object to another object.

Windows 712 and 722 depict zoomed in areas of the first object 710 and the second object 720. Window 712 provides examples of silhouette edges, and window 722 provides examples of texture edges. The silhouette edges in window 712 are included in a leg of the first object 710. The texture edges in window 722 are included on skin of the second object 720.

To determine that an edge in the window 712 is a silhouette edge, a first line 714 may be identified in image 700. The first line 714 may be perpendicular to an edge identified in the window 712. The first line 714, as described above, may be used to identify pixels to use when determining a type of the edge.

Similarly, to determine that an edge in the window 722 is a texture edge, a second line 724 may be identified in image 700. The second line 724 may be perpendicular to an edge identified in the window 722. The second line 724, as described above, may be used to identify pixels to use when determining a type of the edge.

Figure 8B:
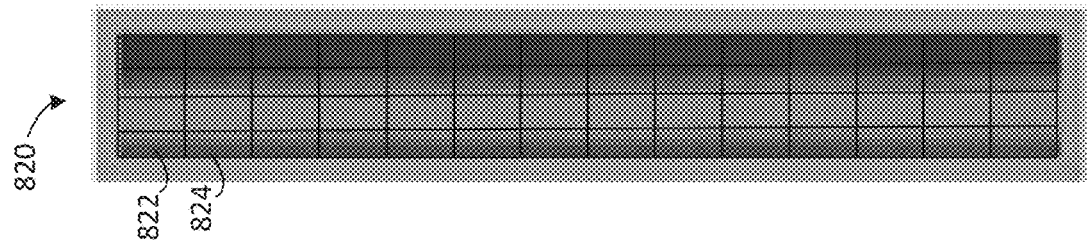
FIGS. 8A and 8B are portions of multiple images that are used to determine a type of an edge.

While FIG. 7 only illustrates a single image, it should be recognized that there may be several images of the first object 710 and/or the second object 720 that are each taken from a different viewpoint. In each of the different viewpoints (where the viewpoints are similar to the viewpoint depicted in FIG. 7), a second edge corresponding to the edge may be identified. The second edge may be identified by processes described above. And for each of the second edges, points may be determined using lines similar to as described above. Then, color values (e.g., red, green, and/or blue color components, luma and/or chroma color components, and/or color values of other suitable color components, of the points) of points from each image may be compared to each other, as depicted in FIGS. 8A and 8B.

Figure 8A:
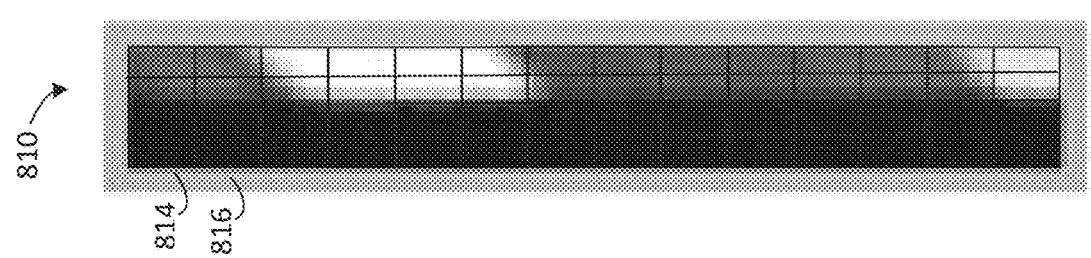

FIG. 8A illustrates an example of points for a first edge from multiple images. In the example, each row may be a different image. For example, a first row 814 may be from a first image, where each column corresponds to a different point in the first image. Accordingly, FIG. 8A is illustrating an example with 15 different images and two points from each side of the point.

When determining a type of the edge, it can be determined whether corresponding points between images have similar colors. If the corresponding points between images do have similar colors, it may be assumed that the edge is a texture edge. This is because the different viewpoints will effectively go around the object. While a silhouette edge would not be consistent when going around because of changes in background, a texture edge would be consistent when going around. Accordingly, the edge may be determined as a silhouette edge when the points on a particular side of the edge are not consistent across the images (e.g., some images have the points as a first color and some images have the points as a second color). The determination for the edge is confirmed by identifying that points left of the edge are primarily a single color.

Similarly as described above, FIG. 8B illustrates an example of points for a second edge from multiple images. In the example, each row may be a different image. For example, a first row 822 may be from a first image, where each column corresponds to a different point in the first image. Accordingly, FIG. 8A is illustrating an example with 15 different images and two points from each side of the point.

When determining a type of the edge, it can be determined whether corresponding points between images have similar colors. If the corresponding points between images do have similar colors, it may be assumed that the edge is a texture edge. This is because the different viewpoints will effectively go around the object. While a background point would not be consistent when going around the edge, a texture edge would have similar points when going around the edge. Accordingly, the edge may be determined as a texture edge because the points left and right of the edge are relatively consistent across the images (e.g., all corresponding points across the images have relatively the same color).

Figure 9B:
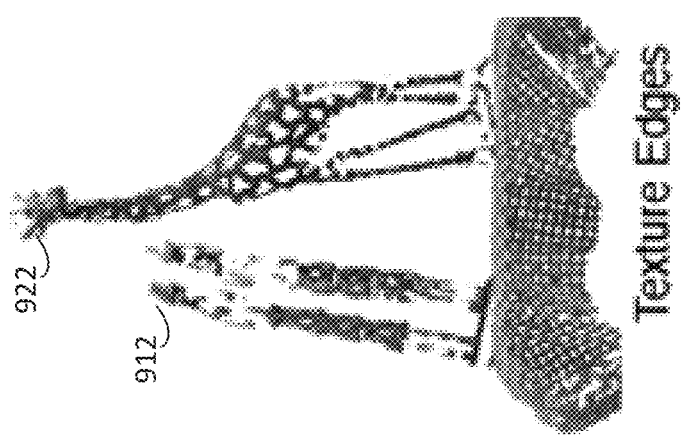
FIG. 9B is an image illustrating only texture edges.
Figure 9A:
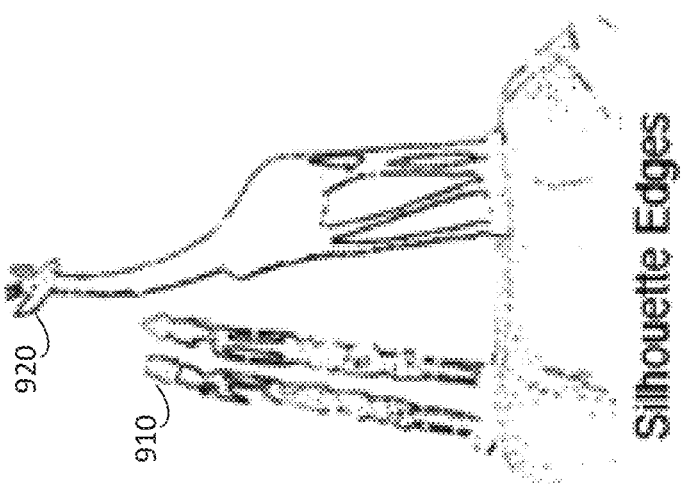
FIG. 9A is an image illustrating only silhouette edges

FIGS. 9A and 9B illustrate results of identifying edges in an image. For example, FIG. 9A illustrates edges that may be identified as silhouette edges, and FIG. 9B illustrates edges that may be identified as texture edges. And when an area is completely enclosed by texture edges, each point in the area may be assigned a depth based on the texture edges.

Embodiments described above regarding determining a type of an edge will now be described mathematically. In particular, a texture variation may be measured on both sides of an edge separately. For a pixel p in $I_i$, whose depth value is $d_p = D_i(p)$, its image gradient direction may be first computed:

$$\theta(p) = \tan^{-1}(\nabla_y I_i(p)/\nabla_x I_i(p)).$$

Note that $\theta(p)$ may be different than $\gamma_{i,j}(p, q)$; $\theta(p)$ may be computed per image, whereas $\gamma_{i,j}(p, q)$ may be computed between different images inside L. Then, a thin rectangular patch on each side of pixel p along $\theta(p)$ may be sampled. In some examples, the sampled pixels may be vectorized within the two patches, and the one taken in the positive $\theta(p)$ direction may be denoted by $f_+$ and the other by $f_-$. The two patches may then be projected to the neighboring views in light field L through a fronto-parallel plane placed at depth $d_p$. In a second view, say image $I_j$, the pixels within the projected patches may be sampled, forming $g_+$ and $g_-$, also vectorized. In certain embodiments, for each direction, three pixels along $\theta(p)$ in image $I_i$ (i.e., a first image) and three other pixels in image $I_j$ (i.e., a second image) may be sampled at the locations that are projected from the three pixels of image $I_i$. One side of the photoconsistency for pixel p between image $I_i$ and image $I_j$ may then be defined as the patch difference between $f_+$ and $g_+$:

$$p(f_+, g_+) = \exp\left(-\frac{1}{2\sigma_p^2}\|f_+ - g_+\|_2^2\right).$$

The other side of the photoconsistency may be defined similarly for $f_-$ and $g_-$. In some examples, $\sigma_p$ may be chosen to be the same as $\sigma_c$ above. The bidirectional photoconsistency values $C_+(p)$ and $C_-(p)$ may be computed by averaging all pairwise photo-consistency values among the views in light field L whose viewing directions are below a threshold (e.g., no more different than 5° from that of image $I_i$).

The bidirectional photoconsistency may indicate the likelihood of both sides being on the same depth as pixel p: if pixel p is on the silhouette, the background seen in one side will move at a different speed with respect to the camera, leading to a low consistency value for that side. The differentiation between texture and silhouette edges may help decide on the direction to which the depth is propagated.

The depth maps $D_i$ may be sparsely sampled because the depths and the consistencies may be computed only on high gradient regions. In this step, the depths and the consistencies may be propagated to smooth regions using edge-aware filtering, thereby exploiting the computed photoconsistencies. However, each pixel p on a high gradient region may have two photoconsistency values, one for each direction along $\theta(p)$, which may require special care during filtering. Because the direct neighbors in these directions should share the depth and confidence values with the edge regions, a simple splatting strategy may be used to avoid this special case: The neighboring pixel p' in the positive $\theta(p)$ direction from p may be assigned $C_+(p)$, whereas the neighboring pixel in the negative $\theta(p)$ direction may be assigned $C_-(p)$. The depth values $D_i(p')$ with $D_i(p)$ may be initialized. If a pixel p' may be affected by multiple pixels on high gradient regions, the depth and confidence values from the neighbor may be chosen with the highest confidence value. For the high gradient regions, the higher value of $C_+(p)$ and $C_-(p)$ may be kept as $C_i(p)$.

Now that per-pixel depth and confidence maps may be computed for each view, confidence-weighted joint-edge-aware filtering may be employed using the images $I_i$ inside light field L as the joint-domains, which may make use of a geodesic filter. First, $D_i$ and $C_i$ may be multiplied element-wise and $D_i$ and $C_i$ may be filtered using the geodesic filter with $I_i$ as the joint domain, which generates $(C_i \odot D_i)'$, where $\odot$ represents element-wise multiplication. This process may give higher emphasis to depth values with higher confidence. The results may then be normalized by dividing $(C_i$ ⊙ $D_i$)' by $C_i$', the filtered version of the confidence map, again element-wise. The final depth map may be computed as $$D'_i = \left(\frac{(C_i \square D_i)'}{C'_i}\right).$$

In order to avoid depth values that are vaguely between the foreground object and the background clutter, the filtering operation may be applied for the foreground and background depth maps separately. If the confidence at pixel p is larger in the foreground depth map, this depth value may be kept for that pixel, and vice versa. The final confidence map may then be the absolute difference between the confidence maps for the foreground and background depth maps. From this point on, $D_i'$ and $C_i'$ will be referred to as $D_i$ and $C_i$, respectively.

The depth propagation step may generate dense depth maps for each input image $I_i$ independently, where smooth regions are assigned depth values by interpolating known depth values at image edges. These depth maps may already describe the objects shape as a point cloud, but may have inconsistencies due to the inexact image-space filtering operation.

Referring back to FIG. 2, at 240, the depth maps may be aggregated in a three-dimensional space (sometimes referred to as an aggregation stage, as illustrated at 150 in FIG. 1). The aggregation may reconstruct a globally consistent object representation in the form of a mesh (as described at 150 in FIG. 1, where a mesh for the object is generated based on the aggregated depth maps).

Because the number of views may be in the order of thousands, computing globally consistent depth maps might not be a viable option due to the time complexity. On the other hand, having a very large number of depth maps may have the advantage that their consensus in three-dimensional space provides enough information to infer the actual surface. Noisy estimates from a small number of views may be tolerated by correct estimates from other views that see the same scene point.

The same voxel grid V as described above may be used, but this time, both foreground and background points may be utilized. For each v∈V, the probability H(v) of that voxel being on the surface of the object may be computed. In order to compute these probabilities, every voxel v may be projected to the images, and $D_i$ and $C_i$ may be interpolated. Given a voxel v projects to a subpixel location $p_i$ in image $I_i$, with interpolated depth value $d_i$ and confidence value $c_i$, the per-view probability of having the surface at v may be computed by differentiating between two cases. If depth $d_i$ falls inside V, it may be a foreground point. The confidence $c_{v,i}$ of having the surface at v may be computed using an exponential decay function, depending on the difference between $d_i$ and $d_{v,i}$, the depth of v with respect to image $I_i$:

$$c_{v,i} = c_i \cdot \exp(-|d_i - d_{v,i}|_2^2/(2\sigma_v^2)).$$

If depth $d_i$ is outside V, i.e., is a background point, then $c_{v,i} = -c_i$, because all voxels on this viewing ray should be in free space and affected in the same magnitude. Using these confidence values, Bayes' rule may be directly applied to compute the per-view probability $P_i(v \in S | c_{v,i})$ of having the surface at v, given the confidence value:

$$P_i(v \in S | c_{v,i}) = \frac{P(c_{v,i} | v \in S) \cdot P(v \in S)}{P(c_{v,i})}$$

where S stands for the set of voxels on the object surface. In some example $P(c_v,i|v \in S)$ may be modeled, e.g., the confidence value of a surface voxel v, using $N(1, \sigma_s)$, with a normal distribution with mean of 1, to handle noise of per-view depth maps. The confidence value of a voxel in the free space, denoted by $P(c_{v,i}|v \in F)$, may also be modeled with a normal distribution $N(-1,\sigma_s)$, but with mean of −1. The denominator in the equation above may be computed as follows:

$$P(c_{v,i}) = P(c_{v,i}|v \in S) \cdot P(v \in S) +$$
$$+ P(c_{v,i}|v \in F) \cdot P(v \in F).$$

In some examples, P(v∈F) and P(v∈S) may be modeled to be of equal probability, 0.5, due to no prior knowledge about the scene.

In some examples, the aggregation scheme may accumulate the per-image probabilities using a geometric mean. Given all $P_i(v \in S|c_{v,i})$, the probability H(v) may be computed using the following formula:

$$H(v) \left(\prod_{i=1}^{n} P_i(v \in S | c_{v,i})\right)^{1/n}.$$

The surface may be generated by thresholding H(v) at 0.2 and applying marching cubes. In some examples, a small value may be used for thresholding, because the surface probabilities may be generally of smaller magnitude compared to the free space probabilities.

In some examples, the resulting mesh may already capture most details of the object and may be ready to be used as is. In order to pronounce the fine details further, the photoconsistency of the voxels inside the surface may be examined.

A general solution for refining the mesh may be to apply volumetric graph-cuts inside the voxel grid. However, untextured thin features, like the legs and arms in the AFRICA dataset, or the straw details of the BASKET dataset, pose a problem for graph-cuts. Around such features, photoconsistency measures might not clearly point to the object boundary, and the graph-cut result may remove them from the final reconstruction altogether. Instead, a voxel carving approach may be used, which only carves out inconsistent voxels and keeps the thin features intact.

In some examples, a region of interest R inside the mesh may be computed, which is 3 voxels deep from the surface, and mesh normals inside R may be propagated. The visibility of the voxels may be computed using the current mesh as a prior and rendering the back-facing faces from each view point $I_i$. If a voxel's depth is smaller than the depth of the mesh seen from $I_i$, then it may be counted as visible from image $I_i$. After all voxels v∈R are projected to all images $I_i$, given a voxel v, the color values $\{c_v(i)\}$ and the weights $\{w_v(i)\}$ may be gathered from all images $I_i$ to which it projects. The weights of views that are not seeing the voxel may be set to 0. For all other views, the weight may be computed as the dot product of the voxel normal $n_v$ and the viewing ray from $I_i$ to v, namely $r_{v,i}$:

$$w_v(i) = \begin{cases} n_v \cdot r_{v,i} & \text{if } n_v \cdot r_{v,i} > 0 \\ 0, & \text{otherwise} \end{cases}$$

Given the colors and weights, a weighted variance of the colors may be computed as the photoconsistency PC(v):

$$PC(v) = \sum_{i=1}^{n} w_v(i)(c_v(i) - \mu_v)^2 / \sum_{i=1}^{n} w_v(i),$$

where $\mu_v$ is the weighted average of $c_v$. In some examples, all voxels that have PC(v) lower than a threshold, which we set to 0.95, may be carved out. The carving may be repeated until no voxels are carved out. The voxel carving approach may be very efficient in removing unnecessary voxels from the surface, and may converge very quickly. Finally, all voxels v and their normals $n_v$ on the boundary of R may be supplied to a Poisson surface reconstruction to generate a final result.

Figure 10:
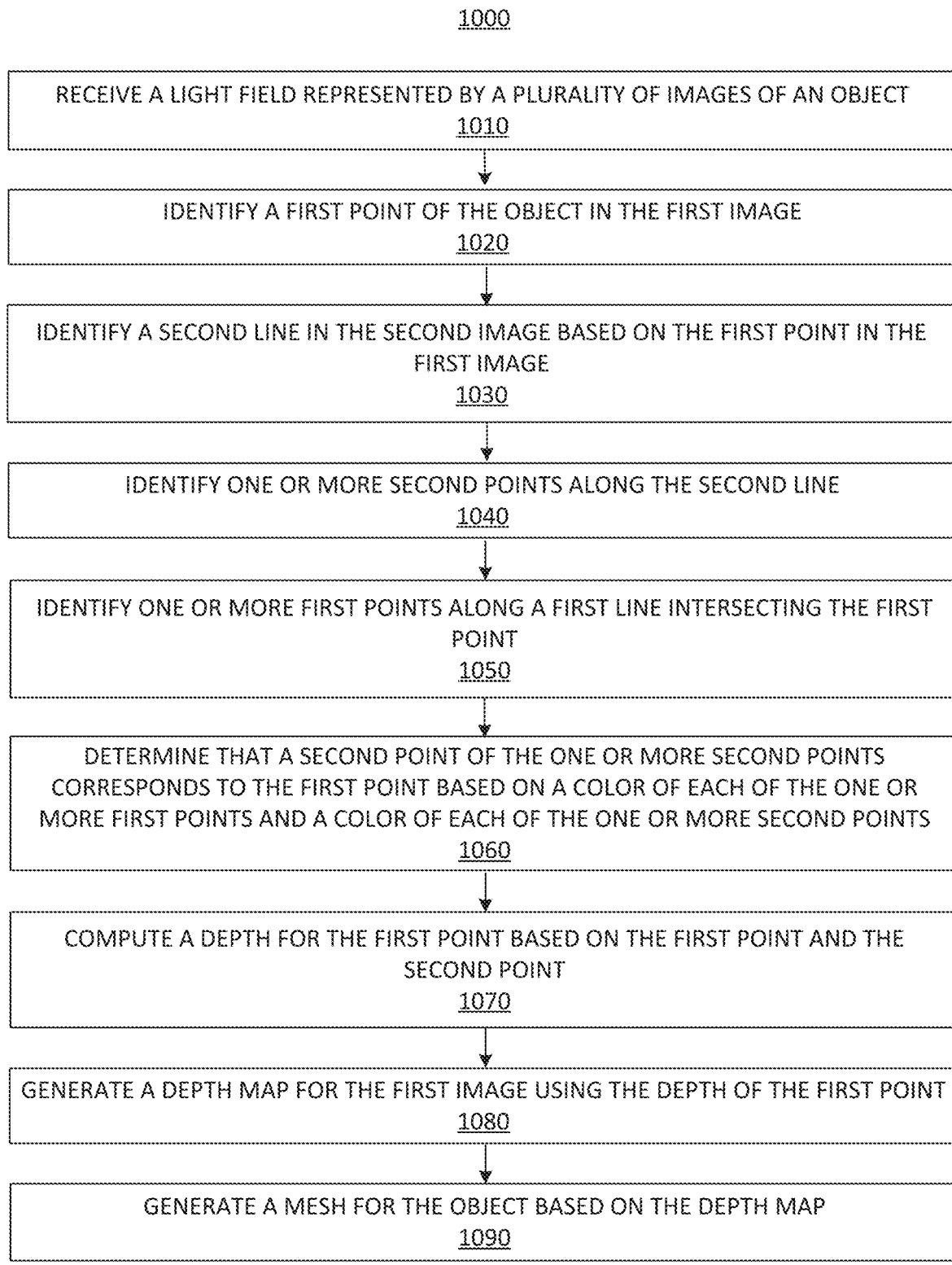
FIG. 10 is a simplified flowchart depicting processing performed for object reconstruction using a particular depth detection technique.

Embodiments of the description above may be depicted by simplified flowcharts. For example, FIG. 10 is a simplified flowchart 1000 depicting processing performed for object reconstruction using a particular depth detection technique. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain embodiments, the steps may be performed in a different order or some steps may also be performed in parallel.

In the example depicted in FIG. 10, the processing may begin at 1010 when a light field represented by a plurality of images of an object is received. The plurality of images may include a first image and a second image, where the second image is at a viewpoint different than but similar to the first image. In some embodiments, the light field may be unstructured.

At 1020, a first point of the object may be identified in the first image. The first point may be identified based on the first point being an edge of the object, as described above.

At 1030, a second line may be identified in the second image based on the first point in the first image. The second line may be an epipolar line, as described above. In some embodiments, the second line may have a direction of an epipolar line for the first point in the first image. At 1040, one or more second points may be identified along the second line. The one or more second points may be consecutive points along the second line.

At 1050, one or more first points may be identified along a first line intersecting the first point. Each point of the one or more first points may be projected from the one or more second points.

At 1060, it may be determined that a second point of the one or more second points corresponds to the first point based on a color of each of the one or more first points and a color of each of the one or more second points.

At 1070, a depth may be computed for the first point based on the first point and the second point. The depth may be computed in response to determining that the second point corresponds to the first point. In some embodiments, a color gradient is used to compute the depth. The color gradient may be computed using colors of the one or more first points and the one or more second points.

At 1080, a depth map may be generated for the first image using the depth of the first point. At 1090, a mesh may be generated for the object based on the depth map.

Figure 11:
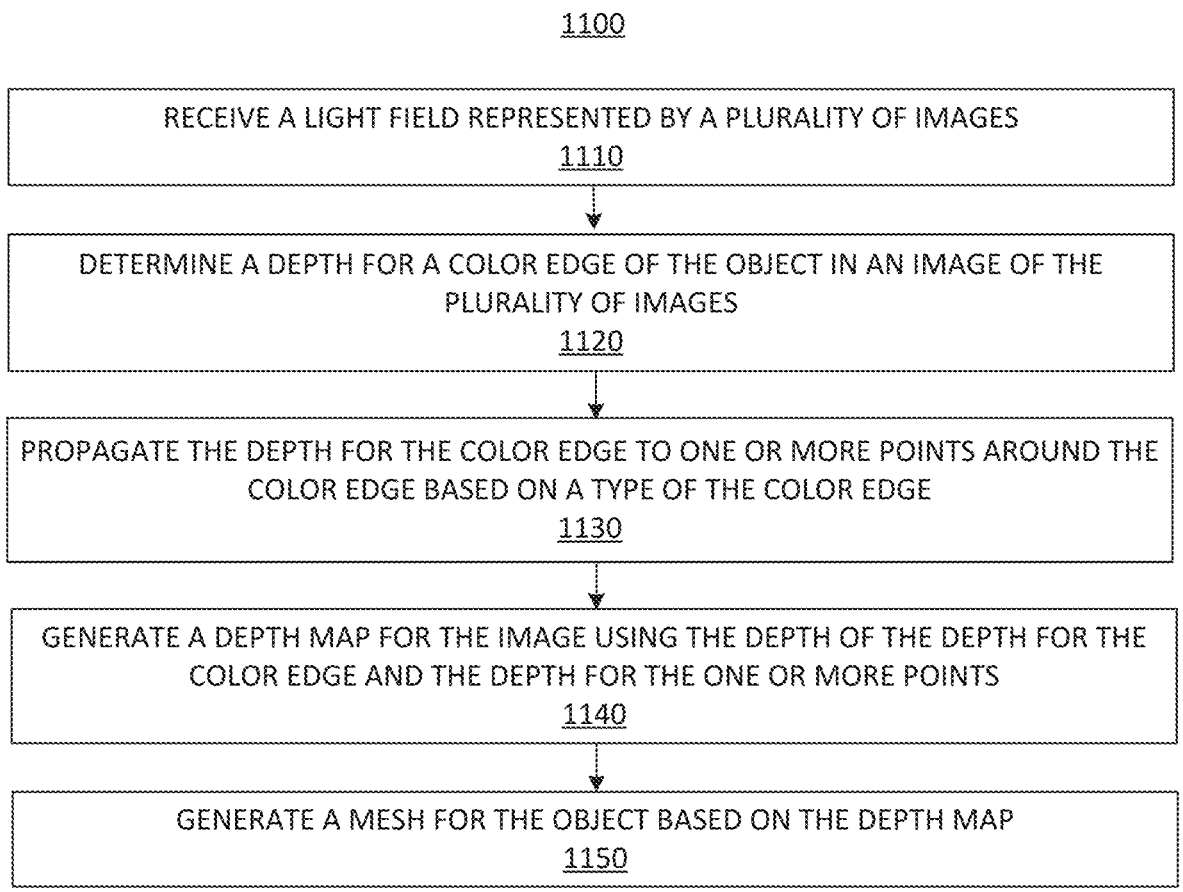
FIG. 11 is a simplified flowchart depicting processing performed for object reconstruction using a particular propagation technique.

FIG. 11 is a simplified flowchart 1100 depicting processing performed for object reconstruction using a particular propagation technique. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain embodiments, the steps may be performed in a different order or some steps may also be performed in parallel.

In the example depicted in FIG. 11, the processing may begin at 1110 when a light field represented by a plurality of images is received. Each image of the plurality of images may be at a different viewpoint, where the plurality of images are associated with an object.

At 1120, a depth may be determined for a color edge of the object in an image of the plurality of images. At 1130, the depth for the color edge may be propagated to one or more points around the color edge based on a type of the color edge. The depth for the color edge may be propagated in two directions when the color edge is determined to be a texture. The depth for the color edge may be propagated in a single direction when the color edge is determined to be a silhouette.

At 1140, a depth map may be generated for the image using the depth for the color edge and the depth for the one or more points. At 1150, a mesh may be generated for the object based on the depth map. In some embodiments, the depth map may be a first depth map. In such embodiments, the mesh may be generated by aggregating the first depth map with a second depth map, where the second depth map is for an additional image of the plurality of images.

In some embodiments, the process depicted in FIG. 11 may further include identifying a plurality of points along a first line perpendicular to the color edge in the image. The processing may further include identifying a second image of the plurality of images, where the second image is a similar viewpoint as the image. The processing may further include identifying the color edge in the second image, identifying a plurality of points along a second line perpendicular to the color edge in the second image, and determining the type of the color edge based on a color of each of the one or more points along the first line and each of the one or more points along the second line. In some embodiments, the plurality of points along the first line may be a first image gradient and the plurality of points along the second line may be a second image gradient. In some embodiments, a first point of the plurality of points along the first line is on a particular side of the color edge in the first image and a second point of the plurality of points along the second line is on the particular side of the color edge in the second image. The color edge may be a first type when the first point and the second point are different colors. The color edge may be a second type when the first point and second point are the same color.

Figure 12:
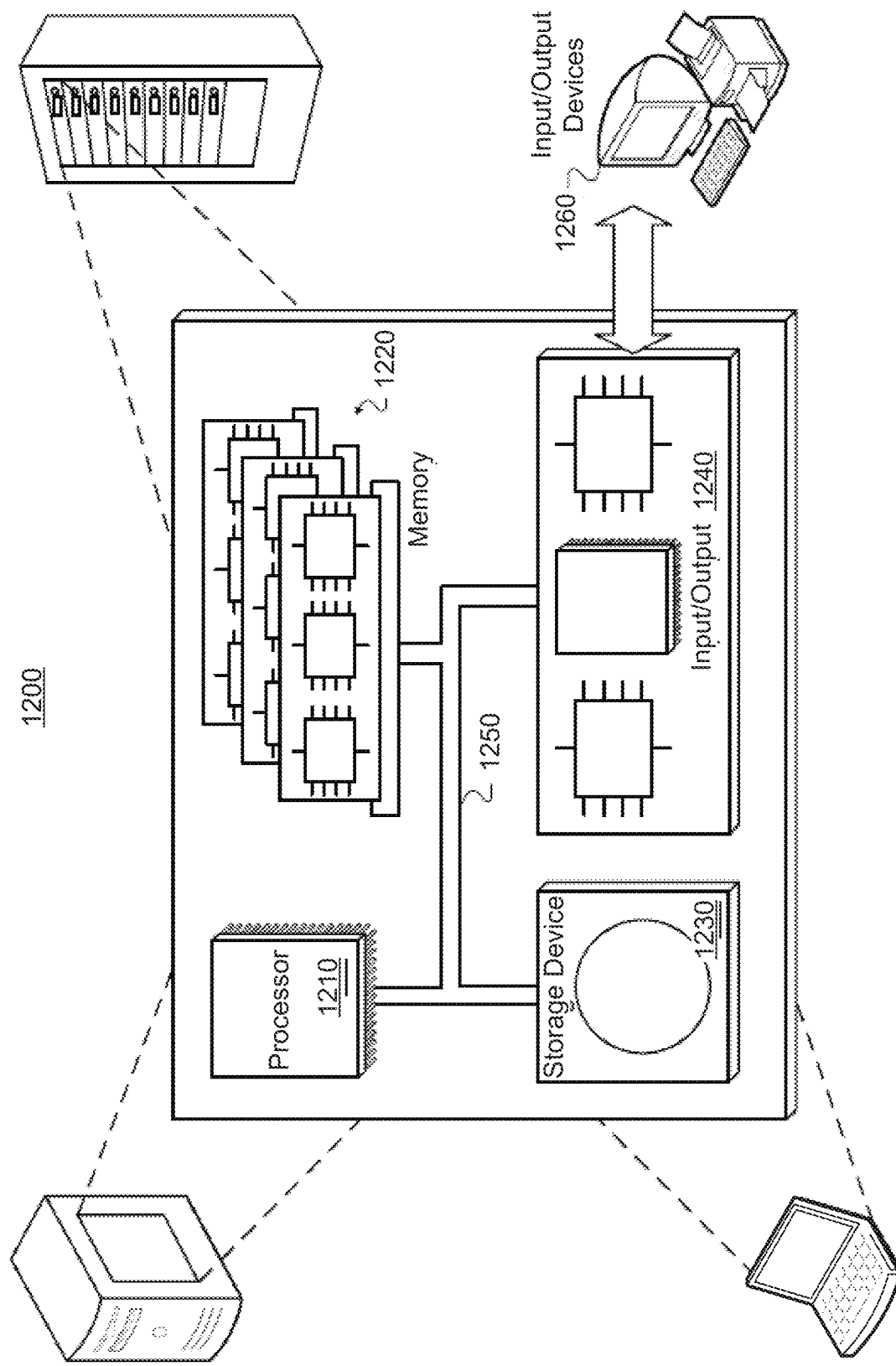
FIG. 12 illustrates an example of a computer system.

FIG. 12 illustrates a schematic diagram of an example of a computer system 1200. This system is exemplary only and one having skill in the art will recognize that variations and modifications are possible. The computer system 1200 can be used for the operations described above. For example, the computer system 1200 shown in FIG. 12 may be used to implement any or the entire tracking framework (e.g., training and tracking stage) techniques and routines described herein.

The system 1200 includes a processor 1210, a memory 1220, a storage device 1230, and an input/output interface 1240. Each of the components 1210, 1220, 1230, and 1240 are interconnected using a system bus 1250. The processor 1210 is capable of processing instructions for execution within the computer system 1200. In one implementation, the processor 1210 is a single-threaded processor. In another implementation, the processor 1210 is a multi-threaded processor. The processor 1210 is capable of processing instructions stored in the memory 1220 or on the storage device 1230 to provide graphical information via input/output interface 1240 for display on a user interface of one or more input/output device 1260.

The memory 1220 stores information within the computer system 1200 and may be associated with various characteristics and implementations. For example, the memory 1220 may include various types of computer-readable medium such as volatile memory, a non-volatile memory and other types of memory technology, individually or in combination.

The storage device 1230 is capable of providing mass storage for the computer system 1200. In one implementation, the storage device 1230 is a computer-readable medium. In various different implementations, the storage device 1230 may be a floppy disk device, a hard disk device, an optical disk device, or a tape device.

The input/output device 1260 provides input/output operations for the computer system 1200. In one implementation, the input/output device 1260 includes a keyboard and/or pointing device. In another implementation, the input/output device 1260 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the present disclosure have been described. Nevertheless, it will be understood that various modification may be made without departing from the scope of the present disclosure.

What is claimed is:

1. A method for 3D object reconstruction, the method comprising:
receiving a light field represented by a plurality of images of an object, wherein the plurality of images include a first image and a second image, and wherein the second image is at a viewpoint different than the first image;

identifying a first point of the object in the first image, the first point being on an edge of the object, the edge identified by a high-gradient region in the first image;
identifying a second line in the second image based on the first point in the first image, the second line comprising an epipolar line based on the first point;
identifying one or more second points along the second line, the one or more second points comprise estimates where the first point is in the second image;
identifying one or more first points along a first line intersecting the first point, wherein each point of the one or more first points is projected from the one or more second points;
determining that a second point of the one or more second points corresponds to the first point based on a color of each of the one or more first points and a color of each of the one or more second points;
computing a depth for the first point based on the first point and the second point, wherein the depth is computed in response to determining that the second point corresponds to the first point, wherein a color gradient is computed using colors of the one or more first points and the one or more second points, and wherein the color gradient is used to compute the depth of the first point;
propagating the depth to one or more points around the edge of the object based in part on a type of a color edge being a texture edge, wherein the texture edge is a boundary of the object that includes points on both sides of the boundary having similar depths;
generating a depth map for the first image using the depth of the first point; and
generating a mesh for the object based on the depth map.

2. The method of claim 1, wherein a color gradient is computed using colors of the one or more first points and the one or more second points, and wherein the color gradient is used to compute the depth.

3. The method of claim 1, wherein the first point is a color edge of the object, and wherein the second point corresponds to the first point such that the second point is the color edge of the object.

4. The method of claim 1, wherein the light field is unstructured.

5. The method of claim 1, wherein a viewpoint of the first image is similar to a viewpoint of the second image.

6. A non-transitory computer-readable storage medium storing a plurality of instructions executable by one or more processors, the plurality of instructions when executed by the one or more processors cause the one or more processors to:
receive a light field represented by a plurality of images of an object, wherein the plurality of images include a first image and a second image, and wherein the second image is at a viewpoint different than the first image;
identify a first point of the object in the first image, the first point being on an edge of the object, the edge identified by a high-gradient region in the first image;
identify a second line in the second image based on the first point in the first image, the second line comprising an epipolar line based on the first point;
identify one or more second points along the second line, the one or more second points comprise estimates where the first point is in the second image;
identify one or more first points along a first line intersecting the first point, wherein each point of the one or more first points is projected from the one or more second points;
determine that a second point of the one or more second points corresponds to the first point based on a color of each of the one or more first points and a color of each of the one or more second points;
compute a depth for the first point based on the first point and the second point, wherein the depth is computed in response to determining that the second point corresponds to the first point, wherein a color gradient is computed using colors of the one or more first points and the one or more second points, and wherein the color gradient is used to compute the depth of the first point;
propagate the depth to one or more points around the edge of the object based in part on a type of a color edge being a texture edge, wherein the texture edge is a boundary of the object that includes points on both sides of the boundary having similar depths;
generate a depth map for the first image using the depth of the first point; and
generate a mesh for the object based on the depth map.

7. The non-transitory computer-readable storage medium of claim 6, wherein a color gradient is computed using colors of the one or more first points and the one or more second points, and wherein the color gradient is used to compute the depth.

8. The non-transitory computer-readable storage medium of claim 6, wherein the first point is a color edge of the object, and wherein the second point corresponds to the first point such that the second point is the color edge of the object.

9. The non-transitory computer-readable storage medium of claim 6, wherein the light field is unstructured.

10. The non-transitory computer-readable storage medium of claim 6, wherein a viewpoint of the first image is similar to a viewpoint of the second image.

11. A system comprising:
one or more processors; and
a non-transitory computer-readable medium including instructions that, when executed by the one or more processors, cause the one or more processors to:
receive a light field represented by a plurality of images of an object, wherein the plurality of images include a first image and a second image, and wherein the second image is at a viewpoint different than the first image;
identify a first point of the object in the first image, the first point being on an edge of the object, the edge identified by a high-gradient region in the first image;
identify a second line in the second image based on the first point in the first image, the second line comprising an epipolar line based on the first point;
identify one or more second points along the second line, the one or more second points comprise estimates where the first point is in the second image;
identify one or more first points along a first line intersecting the first point, wherein each point of the one or more first points is projected from the one or more second points;
determine that a second point of the one or more second points corresponds to the first point based on a color of each of the one or more first points and a color of each of the one or more second points;
compute a depth for the first point based on the first point and the second point, wherein the depth is computed in response to determining that the second point corresponds to the first point, wherein a color gradient is computed using colors of the one or more first points and the one or more second points, and wherein the color gradient is used to compute the depth of the first point;

propagate the depth to one or more points around the edge of the object based in part on a type of a color edge being a texture edge, wherein the texture edge is a boundary of the object that includes points on both sides of the boundary having similar depths;

generate a depth map for the first image using the depth of the first point; and generate a mesh for the object based on the depth map.

12. The system of claim 11, wherein a color gradient is computed using colors of the one or more first points and the one or more second points, and wherein the color gradient is used to compute the depth.

13. The system of claim 11, wherein the first point is a color edge of the object, and wherein the second point corresponds to the first point such that the second point is the color edge of the object.

14. The system of claim 11, wherein the light field is unstructured.

15. The method of claim 1, wherein the propagating comprises determining the depth for the color edge in two directions.

16. A method for 3D object reconstruction, the method comprising:

receiving a light field represented by a plurality of images of an object, wherein the plurality of images include a first image and a second image, and wherein the second image is at a viewpoint different than the first image;

identifying a first point of the object in the first image, the first point being on an edge of the object, the edge identified by a high-gradient region in the first image;

identifying a second line in the second image based on the first point in the first image, the second line comprising an epipolar line based on the first point identifying one or more second points along the second line, the one or more second points comprise estimates where the first point is in the second image;

identifying one or more first points along a first line intersecting the first point, wherein each point of the one or more first points is projected from the one or more second points;

determining that a second point of the one or more second points corresponds to the first point based on a color of each of the one or more first points and a color of each of the one or more second points;

computing a depth for the first point based on the first point and the second point, wherein the depth is computed in response to determining that the second point corresponds to the first point, wherein a color gradient is computed using colors of the one or more first points and the one or more second points, and wherein the color gradient is used to compute the depth of the first point;

propagating the depth to one or more points around the edge of the object based in part on a type of a color edge being a silhouette, wherein the propagating comprises determining the depth for the color edge in a single direction when the type of the color edge being the silhouette;

generating a depth map for the first image using the depth of the first point and generating a mesh for the object based on the depth map.

* * * * *